United States Patent [19]
Zander et al.

[11] Patent Number: 5,596,407
[45] Date of Patent: Jan. 21, 1997

[54] OPTICAL DETECTOR FOR ECHELLE SPECTROMETER

[75] Inventors: Andrew T. Zander, Cupertino; Charles B. Cooper, III, Redwood City; Ring-Ling Chien, San Jose, all of Calif.

[73] Assignee: Varian Associates, Inc, Palo Alto, Calif.

[21] Appl. No.: 477,169

[22] Filed: Jun. 7, 1995

[51] Int. Cl.$^6$ .................................. G01J 3/18; G01J 3/36
[52] U.S. Cl. ......................................... 356/328; 250/208.6
[58] Field of Search .......................... 356/328; 250/208.6

[56] References Cited

U.S. PATENT DOCUMENTS

| | | | |
|---|---|---|---|
| 4,820,048 | 4/1989 | Barnard | 356/328 |
| 4,940,325 | 7/1990 | Becker-Ross et al. | 356/328 |
| 5,002,390 | 3/1991 | Gerlacher et al. | 356/307 |
| 5,018,856 | 5/1991 | Harnly et al. | 356/328 X |
| 5,087,123 | 2/1992 | Gerlacher et al. | 356/307 |

OTHER PUBLICATIONS

Donald G. York et al., "Echelle Spectroscopy With A Charge–Coupled Device (CCD)," SPIE vol. 290 Solid State Imagers For Astronomy (1981), pp. 202–207.

*Primary Examiner*—Vincent P. McGraw
*Attorney, Agent, or Firm*—Edward Berkowitz

[57] ABSTRACT

A solid-state detector for use in an atomic spectrometer comprises a plurality of arrays of sensing elements, or pixels, each of the arrays being positioned along and on the locations of spectral signals on a focal plane of an echelle grating spectrometer. The sensing elements are positioned along the many diffraction orders presented on a two-dimensional echelle grating focal plane so that at least one element is located at each and every resolution element regardless of global x-y coordinate positioning of the elements or with reference to each other. The result is a series of skewed lines of sensing elements, those lines being in the same shape as the series of diffraction order lines which comprise an echelle spectrum. The solid-state detector is particularly useful in an atomic spectrometer wherein an echelle grating is used to diffract incident radiation such that the various components of the radiation may be observed.

14 Claims, 3 Drawing Sheets

OPTICAL DETECTOR FOR ECHELLE SPECTROMETER

BACKGROUND OF THE INVENTION

Atomic spectroscopy finds extensive application in areas of atomic emission, atomic absorption and atomic fluorescence. In particular, spectrometers of the echelle variety, in which an echelle grating is used to disperse the radiation of interest, have proven to have certain advantageous characteristics, related to resolution and spectrometer design, when compared to spectrometers using conventional, high ruling density diffraction gratings. In an echelle spectrometer, greater resolution of the spectral lines derives from the fact that resolution increases as the diffraction order increases. Thus, the use of orders 20–90, for example, will yield greater resolution than the use of orders 1, 2 and 3, for example. Also, the physical size of the spectrometer is reduced by use of an echelle diffraction grating.

When using an echelle grating, the various diffraction orders normally lie essentially atop one another. A prism is commonly used to separate the orders after diffraction by the grating, and a two-dimensional pattern is formed at the focal plane in the spectrometer. The detector then comprises a two-dimensional surface containing sensing elements to detect the spectral lines.

Various types of optically-detecting semiconducting material devices have been used to collect and detect the photon signals present on focal planes of various configuration in analytical spectrometers. Linear and area arrays of photodiodes, charge-coupled devices, charge injection devices, and plasma coupled devices have been used to retrieve optical signals from conventional diffraction grating spectrometers as well as echelle grating spectrometers.

As one example of a charge-coupled device that has been employed to detect the two-dimensional diffraction patterns in echelle spectrometers, an x-y grid of pixels having 1000 rows and 1000 columns of pixels, or a total of 1,000,000 pixels, may be placed at the focal plane to detect the spectral lines. This arrangement has the advantage of being able to detect virtually all signals within the spectrometer, including background noise. Disadvantages of this form of detector include mismatch between the information sought and the detector array, loss of portions of the spectrum, and unnecessarily long read-out time. The two-dimensional diffraction pattern for continuous wavelength coverage at a given diffraction angle will form a "keystone" pattern, rather than a rectangle. The use of one or more x-y grid detectors means a mismatch of shapes between the detector and the diffraction pattern. Tradeoffs exist between underfilling/overfilling of the detector and loss of portions of the diffraction spectrum. In addition, because every pixel is read in the x-y grid, read-out time is high, even though most of the pixels will have no useful information.

Another version of solid-state detector is reflected in U.S. Pat. No. 4,820,048, to Barnard. Barnard, in effect, eliminates most of the pixels in the x-y grid, leaving small sets of linear CCD arrays positioned so as to receive only selected spectral lines and nearby background radiation. This drastic reduction in the number of pixels reduces the read-out time for the detector, but any radiation not falling at the selected line positions will not be sensed, decreasing the flexibility of this detector as compared to the x-y grid.

Therefore, an object of the present invention is to provide more efficient and effective means to match analytical spectral signals in a focal plane of an analytical spectrometer with semiconductor solid-state optical detector devices.

Another object of the present invention is to provide complete pixel coverage of each echelle diffraction order over the free spectral range at that diffraction angle while not unduly increasing the read-out time required.

Another object is to provide a detector having arrays of sensing elements positioned exactly along and on the locations of spectral signals on a focal plane of an echelle grating spectrometer.

Yet another object of the present invention is to provide a solid-state detector having skewed lines of pixels so that there is exact registry between the pixels and the configuration of the diffraction orders so there is continuous spectral coverage of the entire echelle grating focal plane which is produced by a particularly designed echelle grating spectrometer.

Still another object is to provide a detector having skewed lines of pixels, wherein each skewed line covers a specific diffraction order and has a number of pixels which is chosen to match the number of resolution elements available in that order over the free spectral range.

Another object is to provide a detector having skewed lines of pixels, wherein each skewed line covers a specific diffraction order and has a length which is chosen to match the length of that order of the free spectral range.

Another object is to provide a detector having skewed lines of pixels, wherein each skewed line covers a specific diffraction order and has pixels of sizes chosen to match the sizes of the resolution elements available in that order.

Still another object is to provide a detector having arrays of pixels along the locations of the diffraction orders such that the lines track the angles and the curvature of the diffraction orders as those angles and curvature change.

Another object of the invention is to provide a detector having pixels arranged along the locations of the diffraction orders so there is a continuous acceptance of spectral information across the orders.

SUMMARY OF THE INVENTION

The detector of the present invention comprises a solid-state device for use in an echelle spectrometer. The device has a surface on which an arrangement of sensing elements is located. The sensing elements, or pixels, are arranged to form skewed lines, each skewed line including a plurality of pixels. Each skewed line is positioned on the detector so as to provide complete spectral coverage of one echelle diffraction order in the spectrometer over the free spectral range at that diffraction angle. Each skewed line tracks the angle and curvature of its respective diffraction order as the angle and curvature of that order changes along its length. This arrangement provides for reception of all spectral information along the given diffraction order.

In a preferred embodiment, the detector includes read-out circuitry formed within the solid-state device. The read-out circuitry includes a plurality of read circuits, each read circuit coupled to a portion of one skewed line of pixels, and a plurality of read-out amplifiers, each amplifier being coupled to a plurality of read circuits.

The invented detector is for use in an echelle spectrometer having an echelle diffraction grating and associated optical elements. The echelle grating and optical elements cooperate to form a two-dimensional diffraction pattern in a focal plane at which the detector is located. The skewed lines of pixels of the detector are positioned so as to coincide with the diffraction orders in the focal plane. Such coincidence of pixel lines and diffraction orders allows for detection of all spectral information along each diffraction order presented without unduly increasing read-out time.

DRAWINGS

Figure 4:
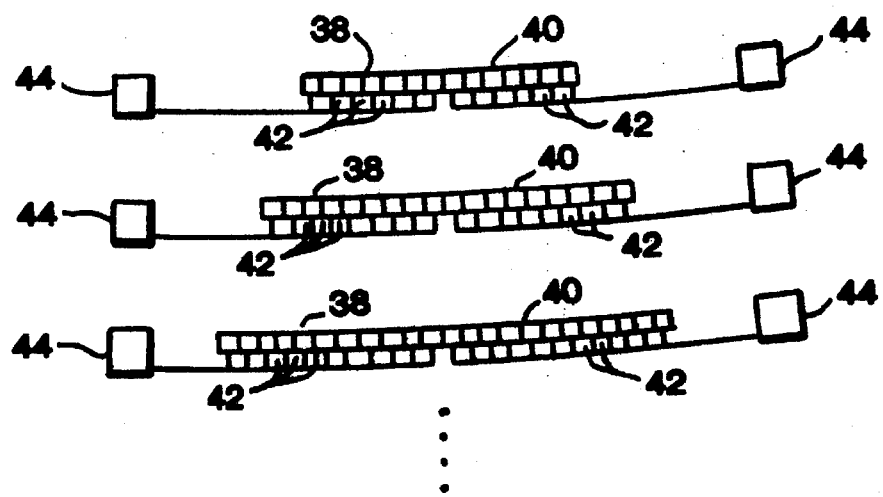

FIG. 4, showing an enlarged portion of one embodiment of the detector, demonstrates how the read-out circuitry may be positioned on the detector and how the circuitry may interconnect with the pixel arrays on the detector.

DETAILED DESCRIPTION OF ONE EMBODIMENT

Figure 1A:
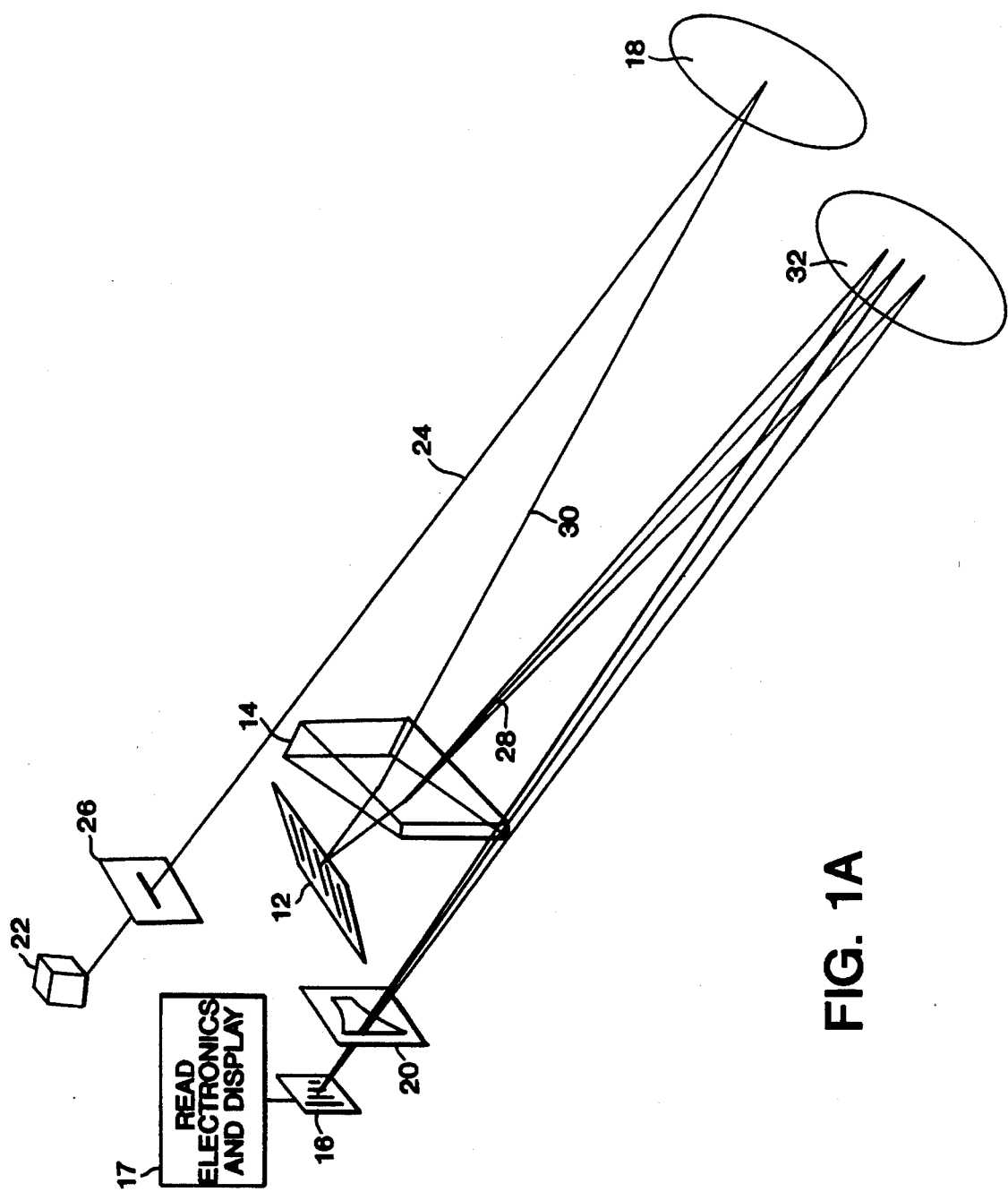
FIG. 1A illustrates the main components of an echelle spectrometer in which the detector of the present invention may be utilized.

FIG. 1 illustrates the main components of an echelle spectrometer 10 in which the detector of the present invention may be used. The spectrometer 10 generally includes an echelle grating 12, a cross dispersion element 14, for example, a prism, and a detector 16. Additional optical elements, such as reflectors 18 and 32, may be included to reflect and focus the incoming radiation, the diffracted radiation, and ultimately the dispersed radiation. Also, a mask 20 may be used between the cross dispersion element 14 and the detector 16 for screening unwanted radiation from the detector 16. The shape of the mask 20 may correspond to the shape of the two-dimensional diffraction pattern created at the focal plane in the spectrometer. The shape of this pattern will be discussed in further detail below.

The electromagnetic radiation 24 to be analyzed, typically emanating from a source 22 by way of a slit 26, may first be reflected at reflector 18 and becomes incident on the echelle grating 12. The diffracted beam 28 includes relatively high orders, but because the angle between the incident beam 30 and the diffracted beam 28 is small compared to the equivalent angle in a conventional grating spectrometer, the higher orders in the diffracted beam lie generally atop one another. A prism 14 may be used to disperse the various orders, and a two-dimensional diffraction pattern is created. Reflector 32 may be used to focus the multitude of spectral lines in a predetermined focal plane in the spectrometer. A detector 16 according to the present invention is positioned to intercept the spectrum at the focal plane. Signals developed at detector 16 are processed in read-out electronics 17 as further described elsewhere.

Figure 1B:
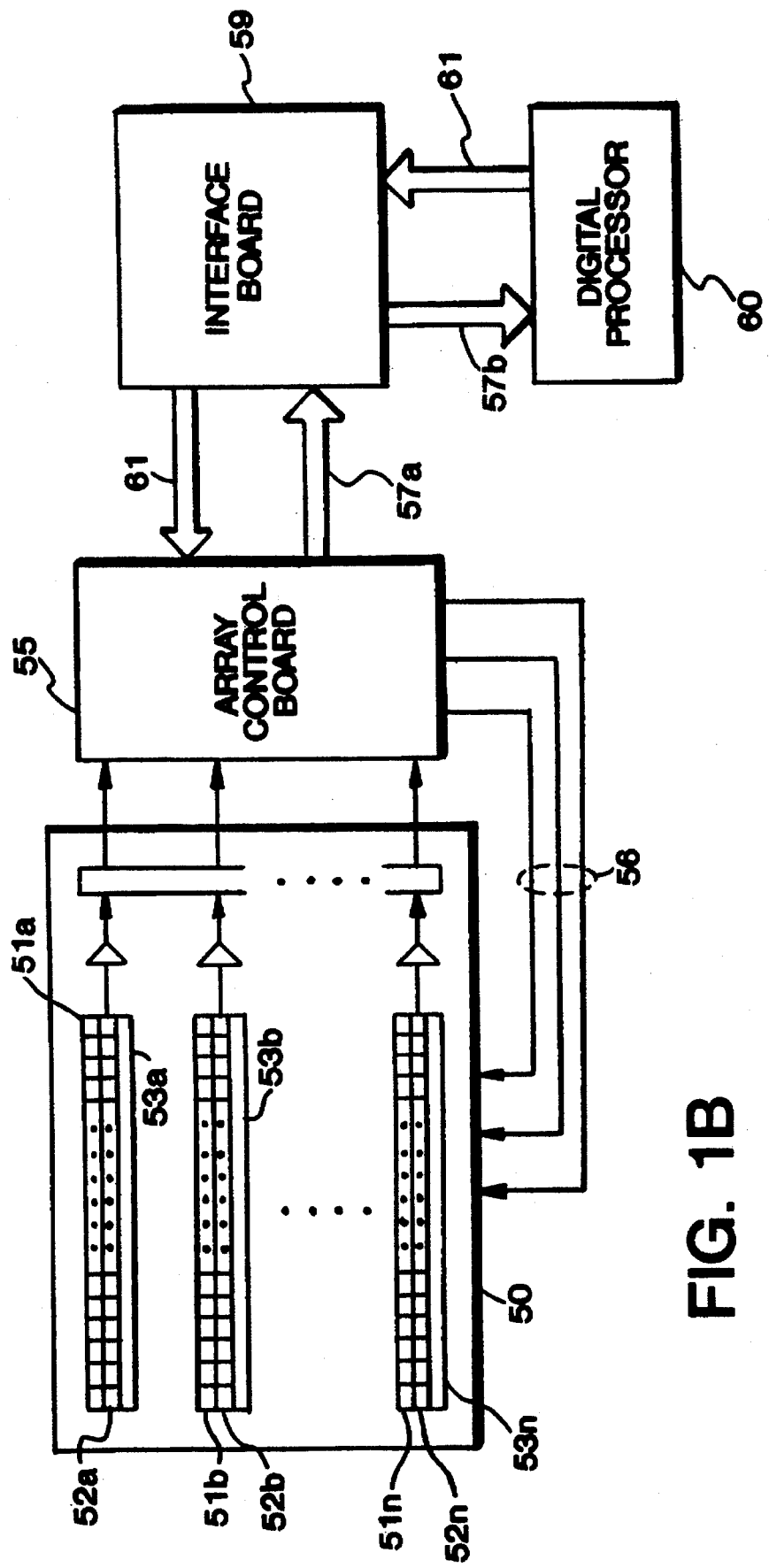
FIG. 1B is a representative schematic of the read-out electronics.

Turning now to FIG. 1B, CCD array 50 represents an array of photodetectors 51a, 51b, . . . 51n, each of which transfers charge to a corresponding register 52a, 52b, . . . 52n and thence to the corresponding read line 53a, 53b, . . . 53n. The data propagating on the read line are directed through a corresponding amplifier and multiplexer and thence to array control board 55. Array control board 55 provides functions normally required for the control and operation of a CCD array, particularly power and control signals 56. One of ordinary skill in the art is familiar with the nature and function of these controls which direct the manner and sequence in which the several read lines 53a, 53b, . . . 53n are interrogated. The data are then organized and directed through data bus 57a through interface board 59 via data bus 57b to general purpose digital processor 60. Digital processor 60 develops the control signals 61 which are conditioned on interface board 59 for directing the operations carried out on array control board 55. The processor 60 also includes display functions for exhibiting the data and for such data processing as may be desired.

An echelle grating that is useful in utilizing a detector of the present invention may be made of fused silica using well-known manufacturing techniques. The grating may have approximately 95 grooves per millimeter cut at a blaze angle of approximately 45°. In this particular spectrometer, the wavelength coverage of primary interest would be about 165 nm to about 800 nm, and diffraction orders 19–88 would be utilized.

Figure 2:
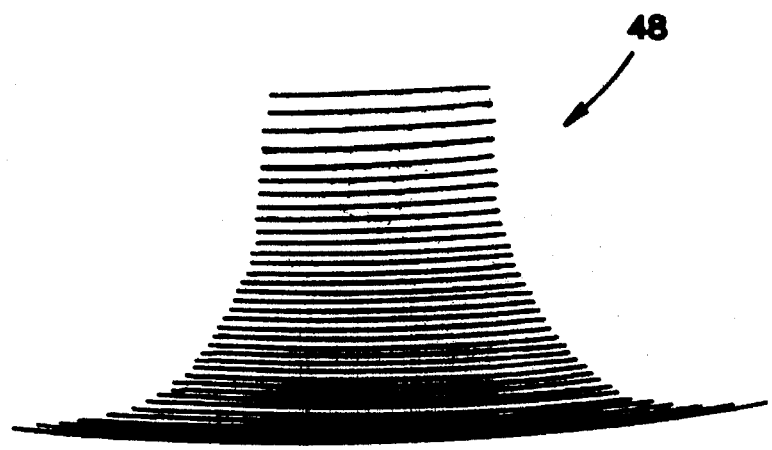
FIG. 2 illustrates a two-dimensional diffraction pattern created in an echelle spectrometer.

FIG. 2 illustrates a two-dimensional diffraction pattern created in the focal plane of an echelle spectrometer. Depending on the particular spectrometer design, each individual order in the pattern may include a plurality of resolution elements of varying sizes. The sizes of the resolution elements may change with diffraction order across the echelle spectrum. Thus, diffraction orders near one end of the pattern could have resolution elements larger in size than the resolution elements in the diffraction orders near the other end of the pattern.

The diffraction order lines 48 in the echelle spectrum, as shown in FIG. 2, are skewed. The lines 48 are not straight, and they are not exactly parallel to one another. Nor are the wavelength regions of interest for different orders of equal length. However, as is well known, for any specific set of echelle spectrometer design parameters, the locations, sizes, spacing and orientations of the lines are predictable.

Figure 3:
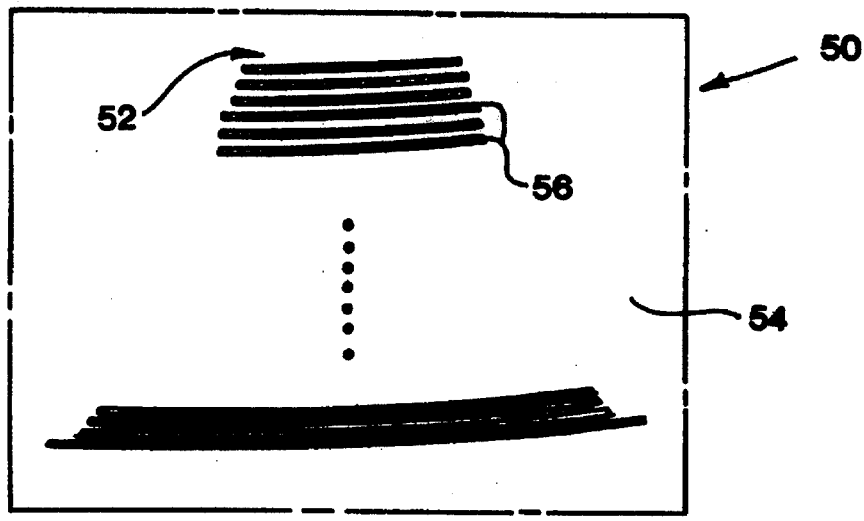
FIG. 3 illustrates one embodiment of the detector of the present invention.

FIG. 3 illustrates the geometric configuration of pixels 52 in one embodiment of the detector of the present invention. The detector 50 comprises a semiconductor chip 54 of silicon generally square or rectangular in shape. A plurality of sensing elements, or pixels 52, is formed in the silicon chip using well-known semiconductor device fabrication processes. The sensing elements are arranged to form a plurality of linear arrays 56, each of which forms a skewed line on the detector. Examination of FIGS. 2 and 3 together reveals that the skewed lines formed on the detector by the pixel arrays 56 are positioned to coincide with the projections of the echelle diffraction orders 48 in the focal plane of the spectrometer. Each of the skewed lines of pixels coincides with a particular echelle diffraction order projection in the focal plane.

Each skewed line array 56 is oriented such that its angle tracks the angle and curvature of the particular diffraction order 48 to be detected by that array. As the angle of a diffraction order 48 changes along its length, the angle of the corresponding pixel array 56 also changes to maintain continuous tracking of the diffraction order. This positioning of the pixel arrays on the detector allows for continuous tracking of the diffraction orders along the entire length of interest. That is, because each pixel array 56 is positioned continuously along a diffraction order projection 48 in the focal plane, each pixel array provides continuous acceptance of spectral information across the order over one free spectral range.

FIG. 3 illustrates that the pixel arrays 56 are of differing lengths. Each array is designed to have a length that matches or approximates the length of the diffraction order 48 that particular array 56 is intended to track. Because the lengths of the orders of each free spectral range vary, likewise the lengths of the pixel arrays vary. Also, as the lengths of the diffraction-orders increase, the number of resolution elements in the orders tends to increase. In a preferred embodiment of the present invention, the number of pixels 52 in each pixel array 56 will correspond to the number of resolution elements in the diffraction order that particular array is intended to track. Furthermore, as the size of the resolution elements varies from order to order or along any given order, the size of the respective pixels will also vary. That is, in the preferred embodiment, each of the pixels is sized according to the size of the resolution element that particular pixel is intended to detect. Even in those embodiments in which the number of pixels in an array is not equal to the number of resolution elements in the particular diffraction order to be detected by that array, the sizes of the pixels can still be made to vary in the array according to variation in the sizes of the resolution elements in that diffraction order. In other words, certain advantages may be realized from variation in pixel size within each array, independent of advantages realized from matching the number of pixels in an array to the number of resolution elements in an order. For example, some of those advantages would include matching pixel height to image height to keep the overall photoactive detector small for reduced cost while maintaining full coverage. Also, pixel width may be optimized to achieve efficient readout at a desired resolution.

As pointed out above, for any given set of echelle spectrometer design parameters, the locations, sizes, spacings and orientations of the diffraction order projections in the focal plane may be predicted. The presently preferred embodiment of the detector of the present invention includes approximately 80,000 pixels arranged into seventy arrays to track diffraction orders 19–88 in an echelle spectrometer. The arrays are constituted as follows:

| Order No. | Approx. # of Pixels | Pixel Width (mm) | Pixel Height (mm) | Array Length (mm) | Wavelength Coverage (nm) |
|---|---|---|---|---|---|
| 88 | 722 | 0.0125 | 0.105 | 9.02 | 168.7046–166.7983 |
| 87 | 730 | 0.0125 | 0.105 | 9.12 | 170.6426–168.6924 |
| 86 | 738 | 0.0125 | 0.1 | 9.23 | 172.6262–170.6305 |
| 85 | 746 | 0.0125 | 0.1 | 9.33 | 174.657–172.6143 |
| 84 | 755 | 0.0125 | 0.095 | 9.44 | 176.7368–174.6453 |
| 83 | 764 | 0.0125 | 0.09 | 9.55 | 178.8674–176.7253 |
| 82 | 773 | 0.0125 | 0.09 | 9.66 | 181.0505–178.8559 |
| 81 | 782 | 0.0125 | 0.085 | 9.78 | 183.2881–181.0392 |
| 80 | 792 | 0.0125 | 0.085 | 9.90 | 185.5823–183.2769 |
| 79 | 802 | 0.0125 | 0.08 | 10.02 | 187.9352–185.5712 |
| 78 | 812 | 0.0125 | 0.08 | 10.15 | 190.3491–187.9243 |
| 77 | 822 | 0.0125 | 0.08 | 10.28 | 192.8264–190.3383 |
| 76 | 833 | 0.0125 | 0.075 | 10.41 | 195.3695–192.8157 |
| 75 | 844 | 0.0125 | 0.075 | 10.55 | 197.9812–195.3589 |
| 74 | 855 | 0.0125 | 0.075 | 10.69 | 200.6642–197.9707 |
| 73 | 867 | 0.0125 | 0.07 | 10.83 | 203.4214–200.6538 |
| 72 | 878 | 0.0125 | 0.07 | 10.98 | 206.2561–203.4111 |
| 71 | 891 | 0.0125 | 0.07 | 11.13 | 209.1713–206.2459 |
| 70 | 903 | 0.0125 | 0.065 | 11.29 | 212.1707–209.1612 |
| 69 | 916 | 0.0125 | 0.065 | 11.45 | 215.2579–212.1607 |
| 68 | 929 | 0.0125 | 0.065 | 11.62 | 218.4368–215.248 |
| 67 | 943 | 0.0125 | 0.06 | 11.79 | 221.7116–218.427 |
| 66 | 957 | 0.0125 | 0.06 | 11.97 | 225.0865–221.7018 |
| 65 | 972 | 0.0125 | 0.06 | 12.15 | 228.5663–225.0768 |
| 64 | 987 | 0.0125 | 0.06 | 12.34 | 232.1559–228.5566 |
| 63 | 1002 | 0.0125 | 0.06 | 12.53 | 235.8606–232.1463 |
| 62 | 1018 | 0.0125 | 0.055 | 12.73 | 239.686–235.851 |
| 61 | 1035 | 0.0125 | 0.055 | 12.94 | 243.6381–239.6765 |
| 60 | 1052 | 0.0125 | 0.055 | 13.15 | 247.7232–243.6286 |
| 59 | 1070 | 0.0125 | 0.055 | 13.37 | 251.9481–247.7137 |
| 58 | 1088 | 0.0125 | 0.055 | 13.60 | 256.3202–251.9387 |
| 57 | 1107 | 0.0125 | 0.055 | 13.84 | 260.8473–256.3108 |
| 56 | 1127 | 0.0125 | 0.055 | 14.08 | 265.5376–260.8378 |
| 55 | 1147 | 0.0125 | 0.055 | 14.34 | 270.4003–265.5282 |
| 54 | 1168 | 0.0125 | 0.055 | 14.60 | 275.4449–270.3909 |
| 53 | 1190 | 0.0125 | 0.055 | 14.88 | 280.6819–275.4355 |
| 52 | 1213 | 0.0125 | 0.055 | 15.16 | 286.1224–280.6725 |
| 51 | 1237 | 0.0125 | 0.055 | 15.46 | 291.7786–286.113 |
| 50 | 1261 | 0.0125 | 0.055 | 15.77 | 297.6635–291.7691 |
| 49 | 1287 | 0.0125 | 0.055 | 16.09 | 303.7911–297.654 |
| 48 | 1314 | 0.0125 | 0.055 | 16.42 | 310.177–303.7816 |
| 47 | 1341 | 0.0125 | 0.055 | 16.77 | 316.8376–310.1673 |
| 46 | 1370 | 0.0125 | 0.055 | 17.13 | 323.7911–316.8279 |
| 45 | 1401 | 0.0125 | 0.055 | 17.51 | 331.0573–323.7813 |
| 44 | 1433 | 0.0125 | 0.055 | 17.91 | 338.6576–331.0473 |
| 43 | 1466 | 0.0125 | 0.055 | 18.32 | 346.6157–338.6476 |
| 42 | 1520 | 0.0125 | 0.055 | 19.00 | 354.9574–346.6055 |
| 41 | 1520 | 0.0125 | 0.055 | 19.00 | 363.7111–354.947 |
| 40 | 1520 | 0.0125 | 0.055 | 19.00 | 372.7228–363.7752 |
| 39 | 1520 | 0.0125 | 0.055 | 19.00 | 382.2711–373.0927 |
| 38 | 1520 | 0.0125 | 0.055 | 19.00 | 392.322–382.9007 |
| 37 | 1520 | 0.0125 | –0.055 | 19.00 | 402.9163–393.2392 |
| 36 | 1520 | 0.0125 | –0.055 | 19.00 | 414.0992–404.1522 |

-continued

| Order No. | Approx. # of Pixels | Pixel Width (mm) | Pixel Height (mm) | Array Length (mm) | Wavelength Coverage (nm) |
|---|---|---|---|---|---|
| 35 | 1520 | 0.0125 | ~0.055 | 19.00 | 425.9213–415.689 |
| 34 | 760 | 0.025 | ~0.055 | 19.00 | 438.4388–427.9046 |
| 33 | 760 | 0.025 | ~0.055 | 19.00 | 451.7151–440.8607 |
| 32 | 760 | 0.025 | ~0.055 | 19.00 | 465.8211–454.6268 |
| 31 | 760 | 0.025 | ~0.055 | 19.00 | 480.8373–469.2812 |
| 30 | 760 | 0.025 | ~0.055 | 19.00 | 496.8545–484.9126 |
| 29 | 760 | 0.025 | ~0.055 | 19.00 | 513.9764–501.6222 |
| 28 | 760 | 0.025 | ~0.055 | 19.00 | 532.3212–519.5253 |
| 27 | 760 | 0.025 | ~0.055 | 19.00 | 552.0248–538.7547 |
| 26 | 760 | 0.025 | ~0.055 | 19.00 | 573.244–559.4633 |
| 25 | 760 | 0.025 | ~0.055 | 19.00 | 596.1606–581.8285 |
| 24 | 760 | 0.025 | ~0.055 | 19.00 | 620.9866–606.0574 |
| 23 | 760 | 0.025 | ~0.055 | 19.00 | 647.9711–632.3929 |
| 22 | 760 | 0.025 | ~0.055 | 19.00 | 677.4083–661.1223 |
| 21 | 760 | 0.025 | ~0.055 | 19.00 | 709.6484–692.5873 |
| 20 | 760 | 0.025 | ~0.055 | 19.00 | 745.1119–727.1983 |
| 19 | 760 | 0.025 | ~0.055 | 19.00 | 784.3075–765.4518 |

The read-out circuitry may be fabricated as a part of the detector chip using well-known design and fabrication techniques, although such an arrangement is not required in order to make or use the invented detector. Indeed, no specific form or arrangement of read-out circuitry is required, but in the presently preferred embodiment shown in FIG. 4, the detector includes the associated read-out circuitry as a part of the same semiconductor chip. Each of the 70 pixel arrays is divided into two portions, a left sub-array 38 and a right sub-array 40. Each of the 140 sub-arrays has dedicated circuits 42 for reading the sub-array pixels. The read-out circuitry is generally positioned between the arrays of pixels, in that area where no spectral information will exist and where no pixels are located. Amplification circuits 44 are positioned at the end of each sub-array, and each amplification circuit is coupled to a plurality of readout circuits. This arrangement allows for variation in integration time such that where greater time is needed, it is available, whereas additional time is not taken where not needed. The result is improved signal-to-noise ratio and reduced read-out time. Other details of the read-out electronics were described above in connection with FIG. 1B.

Although the embodiment described thus far contemplates the use of a silicon substrate for fabrication of the detector and associated circuitry, other embodiments will be fabricated using different semiconductor materials. Also, the detector of the present invention may be realized in a monolithic substrate comprising two or more different semiconducting materials. For example, the detector may include one area that is silicon based and another area that is based on gallium-arsenide. Such a detector would be useful, for example, where both the visible and infrared regions are of interest. That portion of the detector for sensing the visible spectrum might be silicon, whereas the portion of the detector for sensing the infrared region would be gallium-arsenide. Further, the detector could be constructed to include three or more materials. For example, a gallium-arsenide region would detect the infrared spectra, a silicon region would detect the visible region, and a platinum silicide region would detect the ultraviolet spectra. Each of these embodiments would be well within the skill of the ordinary artisan in view of the above specific teachings. All these embodiments could utilize the present invention and realize all or many of the advantages enjoyed by the above-described embodiment.

As will be appreciated, the present invention may take many specific forms and be realized in many different embodiments. The above description relates to but one of the many possible embodiments. The invention is thus described by the following claims.

What is claimed is:

1. A solid-state detector for an echelle spectrometer, comprising:

a plurality of sensing elements on a surface of the detector arranged to form a plurality of sensing element arrays, the plurality of sensing element arrays forming a corresponding plurality of skewed lines on the detector surface, each skewed line positioned to lie along a projection of an echelle diffraction order so as to continuously track the order over the free spectral range.

2. The detector of claim 1, wherein each skewed line is oriented at an angle that is congruent with the projection on said surface of the diffraction order to which that skewed line corresponds.

3. The detector of claim 1, wherein each sensing element array has a length that approximates the predetermined wavelength range of the diffraction order over the free spectral range along which the array is to be positioned.

4. The detector of claim 3, wherein each sensing element array includes a number of sensing elements equal to the number of resolution elements available in the diffraction order along which the array is to be positioned.

5. The detector of claim 4, wherein each of the sensing elements is sized according to the size of the resolution element to be detected by that sensing element.

6. The detector of claim 3, wherein the sensing elements included within any sensing element array are sized according to the sizes of resolution elements available in the diffraction order along which the sensing element array is to be positioned.

7. A solid state detector for use in an echelle spectrometer, comprising:

a semiconductor chip having a plurality of pixel arrays positioned thereon, each pixel array positioned to lie continuously along a projection of a diffraction order at a focal plane in the spectrometer, each pixel array for providing continuous acceptance of spectral information across the diffraction order.

8. A spectrometer, comprising:

an echelle grating for receiving electromagnetic radiation to be analyzed;

a cross dispersion element for dispersing diffraction orders diffracted from the echelle grating, the echelle grating and the cross dispersion element designed to cooperate to form a two-dimensional diffraction pattern at a focal plane in the spectrometer;

a detector situated at the focal plane, the detector including a plurality of pixels arranged to form a plurality of skewed lines on a face of the detector, each skewed line positioned to coincide with a diffraction order at the focal plane; and circuitry, coupled to the plurality of pixels, for generating signals indicative of spectral information received by the pixels.

9. The spectrometer of claim 8, wherein each skewed line is oriented at an angle that is congruent with the projection on said face of the diffraction order with which the skewed line is to be coincident.

10. The spectrometer of claim 9, wherein each array of pixels has a length that approximates the predetermined wavelength range at the focal plane of the diffraction order over the free spectral range with which the array is to be coincident.

11. The spectrometer of claim 10, wherein each array includes a number of pixels equal to the number of resolution elements available in the diffraction order with which the array is to be coincident.

12. The spectrometer of claim 11, wherein each of the pixels is sized according to the size of the resolution element to be detected by that pixel.

13. The spectrometer of claim 8, further comprising a mask positioned between the cross dispersion element and the detector, the mask having a shape corresponding to the shape of the two-dimensional diffraction pattern.

14. A solid-state detector for an echelle spectrometer, comprising:

a first area comprising a first material, the first area including a first plurality of sensing element arrays forming a corresponding first plurality of skewed lines on a surface of the detector, the skewed lines positioned to lie along projections of echelle diffraction orders of a first portion of the free spectral range so as to continuously track said orders over the first portion of the free spectral range; and a second area comprising a second material, the second area including a second plurality of skewed lines on the surface of the detector, the second plurality of skewed lines positioned to lie along projections of echelle diffraction orders so as to continuously track said orders over a second portion of the free spectral range, the first and second materials selected to optimize the detection of wavelengths to be detected in the first and second, spectral portions respectively.

* * * * *